(12) United States Patent
Ohtomo et al.

(10) Patent No.: US 9,958,268 B2
(45) Date of Patent: May 1, 2018

(54) THREE-DIMENSIONAL MEASURING METHOD AND SURVEYING SYSTEM

(71) Applicant: Kabushiki Kaisha TOPCON, Itabashi-ku, Tokyo-to (JP)

(72) Inventors: Fumio Ohtomo, Asaka (JP); Kaoru Kumagai, Tokyo (JP); Hitoshi Otani, Tokyo-to (JP); Kazuki Osaragi, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 606 days.

(21) Appl. No.: 14/518,479

(22) Filed: Oct. 20, 2014

(65) Prior Publication Data

US 2015/0116693 A1   Apr. 30, 2015

(30) Foreign Application Priority Data

Oct. 31, 2013   (JP) .................................. 2013-227100

(51) Int. Cl.
*G01C 3/08* (2006.01)
*G01C 15/00* (2006.01)
(Continued)

(52) U.S. Cl.
CPC ............ *G01C 15/002* (2013.01); *G01S 17/42* (2013.01); *G01S 17/66* (2013.01)

(58) Field of Classification Search
CPC ........ G01C 15/002; G01S 17/42; G01S 17/66
(Continued)

(56) References Cited

U.S. PATENT DOCUMENTS 6,369,755 B1   4/2002   Nichols et al.
6,732,051 B1   5/2004   Kirk et al.
(Continued)

FOREIGN PATENT DOCUMENTS

CA   2832956 A1   10/2012
CN   1545610 A    11/2004
(Continued)

OTHER PUBLICATIONS

Notice of Allowance dated Aug. 3, 2015 in co-pending U.S. Appl. No. 14/590,320.
(Continued)

*Primary Examiner* — Mark Hellner
(74) *Attorney, Agent, or Firm* — Nields, Lemack & Frame, LLC

(57) ABSTRACT

The invention provides a surveying system comprising a total station installed at a known point and having a tracking function, at least one movable measuring device having a prism for retro-reflecting a distance measuring light and a tracking light projected from the total station and capable of moving and of performing three-dimensional measurement on an object to be measured and an arithmetic control part, wherein the movable measuring device has an auxiliary measuring unit capable of measuring a distance and an angle of the object to be measured and an attitude detector capable of detecting a measuring direction, a tilting and a tilting direction of the movable measuring device, wherein the movable measuring device performs three-dimensional measurement on the object to be measured with reference to direction of the total station based on the measurement result of the auxiliary measuring unit and on the detection result of the attitude detector at an arbitrary measurement position as being sighted from the total station, wherein the total station performs three-dimensional measurement on the measure- (Continued)

ment position, and wherein the arithmetic control part performs three-dimensional measurement on the object to be measured with reference to the total station based on the result of three-dimensional measurement obtained by the movable measuring device and on the measurement result by the total station.

9 Claims, 9 Drawing Sheets

(51) Int. Cl.
*G01S 17/42* (2006.01)
*G01S 17/66* (2006.01)

(58) Field of Classification Search
USPC .................................................. 356/4.01
See application file for complete search history.

(56) References Cited

U.S. PATENT DOCUMENTS

| | | |
|---|---|---|
| 7,071,970 B2 | 7/2006 | Benton |
| 7,804,996 B2 | 9/2010 | Ohtomo et al. |
| 7,982,665 B2 | 7/2011 | Kumagai et al. |
| 8,265,817 B2 | 9/2012 | Tener et al. |
| 8,736,819 B2 | 5/2014 | Nagai |
| 9,073,637 B2 | 7/2015 | Ohtomo et al. |
| 9,201,422 B2 | 12/2015 | Ohtomo et al. |
| 9,409,656 B2 | 8/2016 | Ohtomo et al. |
| 2002/0185618 A1 | 12/2002 | Ohishi et al. |
| 2003/0048438 A1 | 3/2003 | Kawamura et al. |
| 2004/0246461 A1 | 12/2004 | Ohtomo et al. |
| 2004/0246498 A1 | 12/2004 | Kumagai et al. |
| 2005/0286760 A1 | 12/2005 | Ohtomo et al. |
| 2006/0271263 A1 | 11/2006 | Self et al. |
| 2007/0265728 A1 | 11/2007 | Marsh et al. |
| 2008/0075325 A1 | 3/2008 | Otani et al. |
| 2008/0154538 A1 | 6/2008 | Stathis |
| 2010/0033371 A1 | 2/2010 | Kumagai et al. |
| 2012/0114229 A1 | 5/2012 | Zhou |
| 2012/0190386 A1 | 7/2012 | Anderson |
| 2012/0262708 A1* | 10/2012 | Connolly .............. B64C 39/024 356/237.2 |
| 2012/0320195 A1 | 12/2012 | Tener et al. |
| 2012/0320203 A1 | 12/2012 | Liu |
| 2013/0176570 A1 | 7/2013 | Beck et al. |
| 2014/0032021 A1* | 1/2014 | Metzler ................ G01S 5/0036 701/3 |
| 2014/0046589 A1* | 2/2014 | Metzler ................ G01B 21/04 701/514 |
| 2014/0210663 A1 | 7/2014 | Metzler |
| 2014/0240498 A1 | 8/2014 | Ohtomo et al. |
| 2014/0336928 A1* | 11/2014 | Scott ..................... G01N 21/88 701/468 |
| 2015/0220085 A1 | 8/2015 | Ohtomo et al. |
| 2015/0232181 A1 | 8/2015 | Oakley et al. |
| 2015/0301180 A1* | 10/2015 | Stettner ................ G01S 17/107 356/5.01 |
| 2016/0049081 A1 | 2/2016 | Ohtomo et al. |

FOREIGN PATENT DOCUMENTS

| | | |
|---|---|---|
| CN | 1789900 A | 6/2006 |
| CN | 101578591 A | 11/2009 |
| CN | 102980556 A | 3/2013 |
| CN | 103090846 A | 5/2013 |
| EP | 0051913 A1 | 5/1982 |
| EP | 2064521 A1 | 6/2009 |
| JP | 5-118850 A | 5/1993 |
| JP | 8-285588 A | 11/1996 |
| JP | 2002-5658 A | 1/2002 |
| JP | 2002-6424 A | 1/2002 |
| JP | 2006-10376 A | 1/2006 |
| JP | 2008-76303 A | 4/2008 |
| JP | 2008-76405 A | 4/2008 |
| JP | 2009-294128 A | 12/2009 |
| JP | 2010-38822 A | 2/2010 |
| JP | 2010-078466 A | 4/2010 |
| WO | 2008/030330 A1 | 3/2008 |
| WO | 2008/067349 A2 | 6/2008 |
| WO | 2012/140191 A1 | 10/2012 |

OTHER PUBLICATIONS

Office action dated Nov. 10, 2015 in co-pending U.S. Appl. No. 14/188,846.
Notice of Allowance dated May 19, 2016 in co-pending U.S. Appl. No. 14/188,846.
Chinese communication dated Jul. 5, 2016 in corresponding Chinese patent application No. 201410599555.2.
Office action dated Sep. 8, 2016 in co-pending U.S. Appl. No. 14/922,345.
Final rejection dated Dec. 13, 2016 in co-pending U.S. Appl. No. 14/921,945.
Office Action dated Apr. 23, 2015 in co-pending U.S. Appl. No. 14/590,320.
European communication dated Mar. 26, 2015 in corresponding European patent application No. 14189220.8.
European communication dated Apr. 1, 2015 in co-pending European patent application No. 15151179.7.
Notice of allowance dated Jun. 1, 2017 in co-pending U.S. Appl. No. 14/921,945.

\* cited by examiner

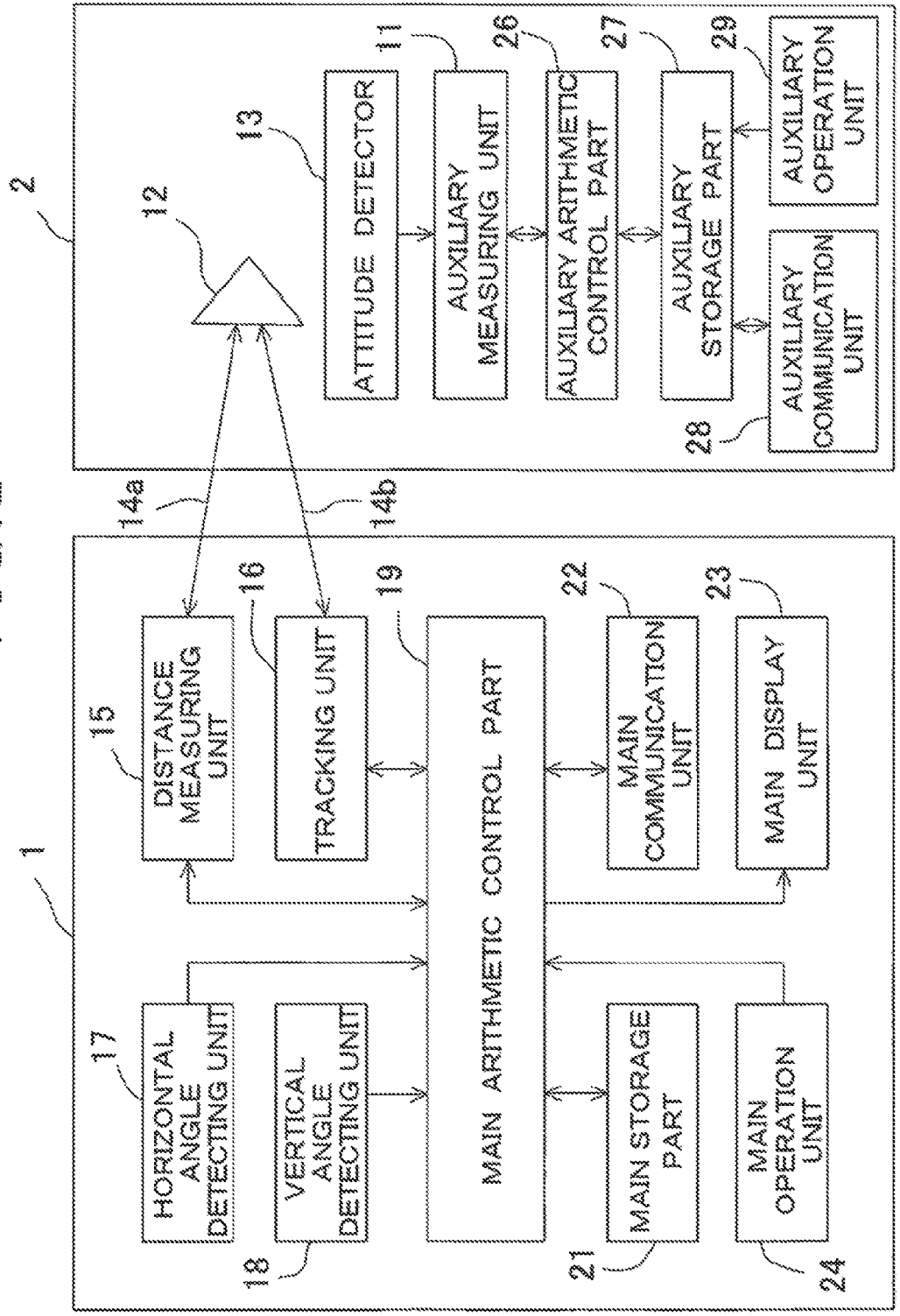

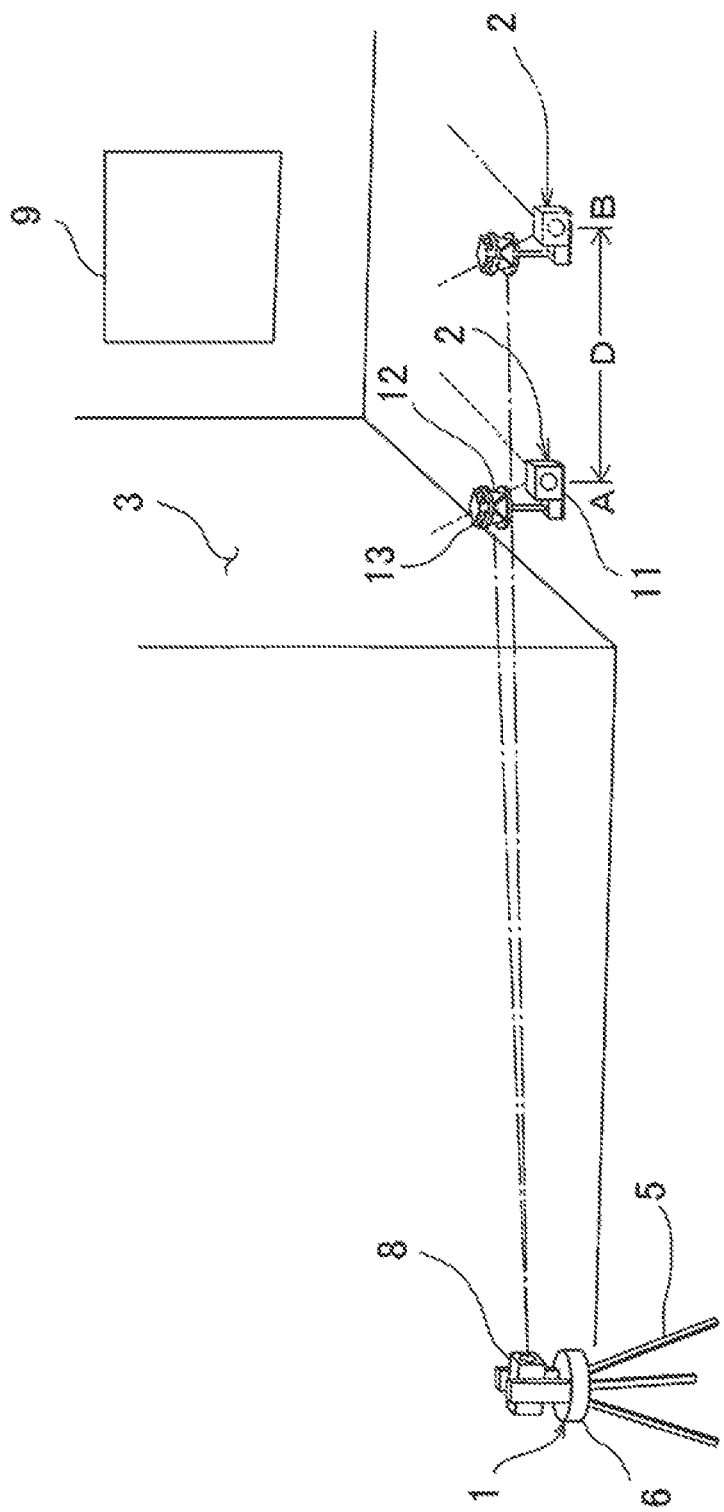

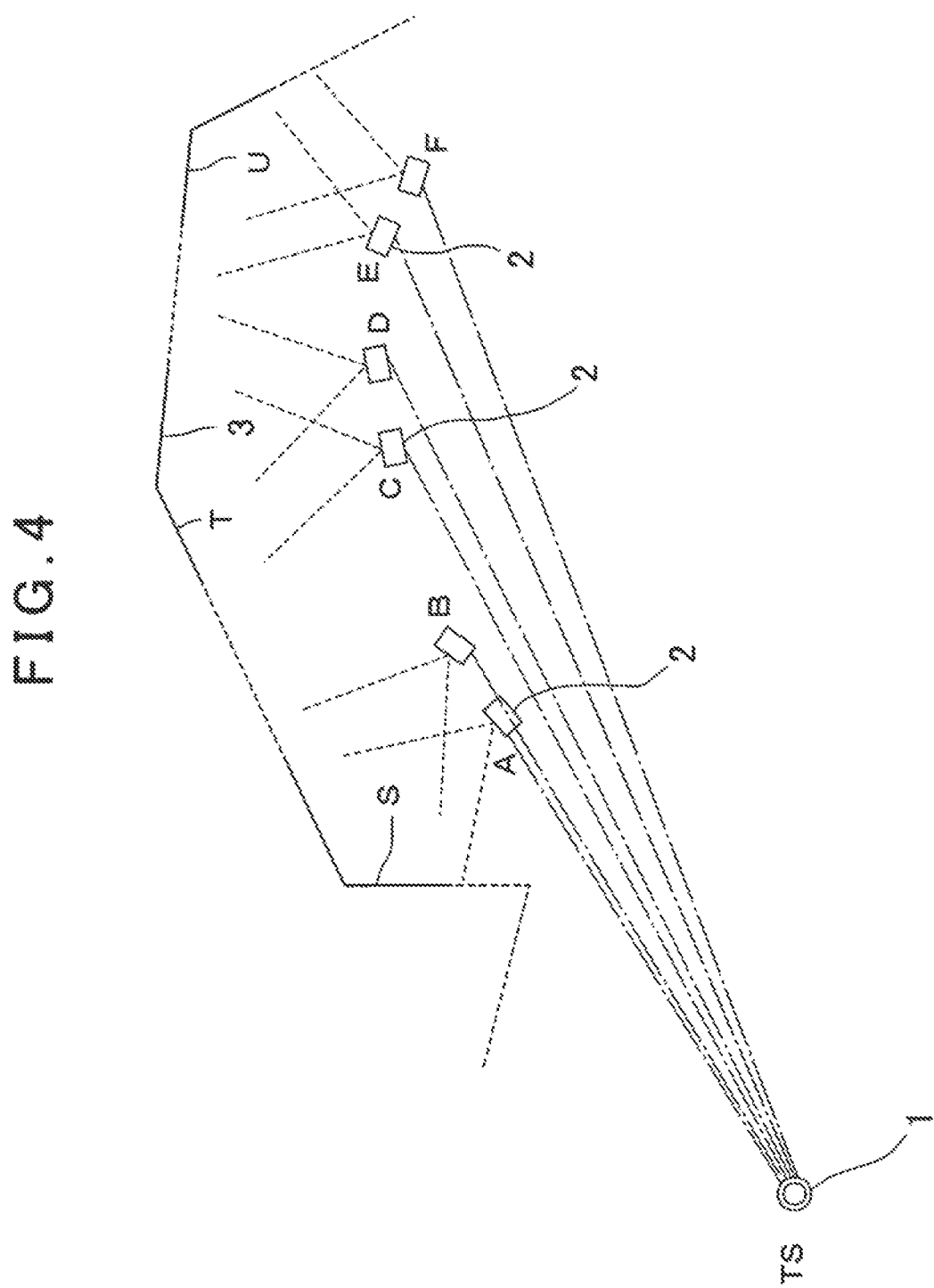

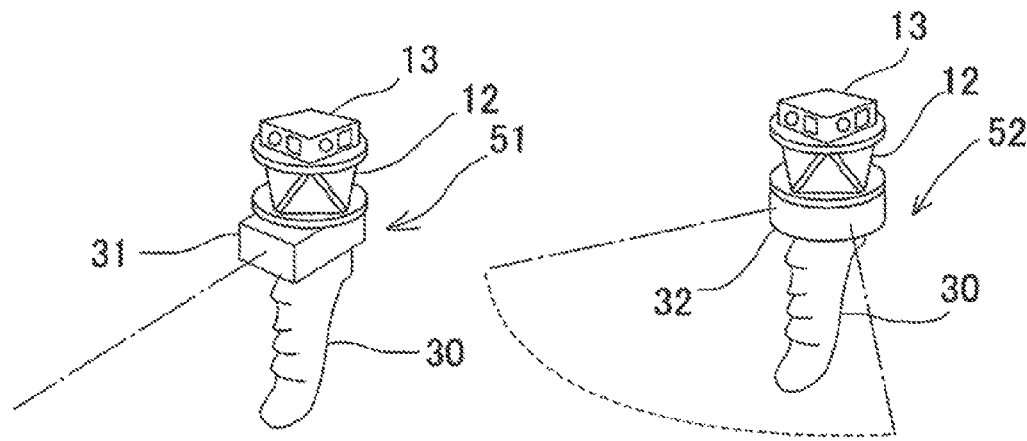
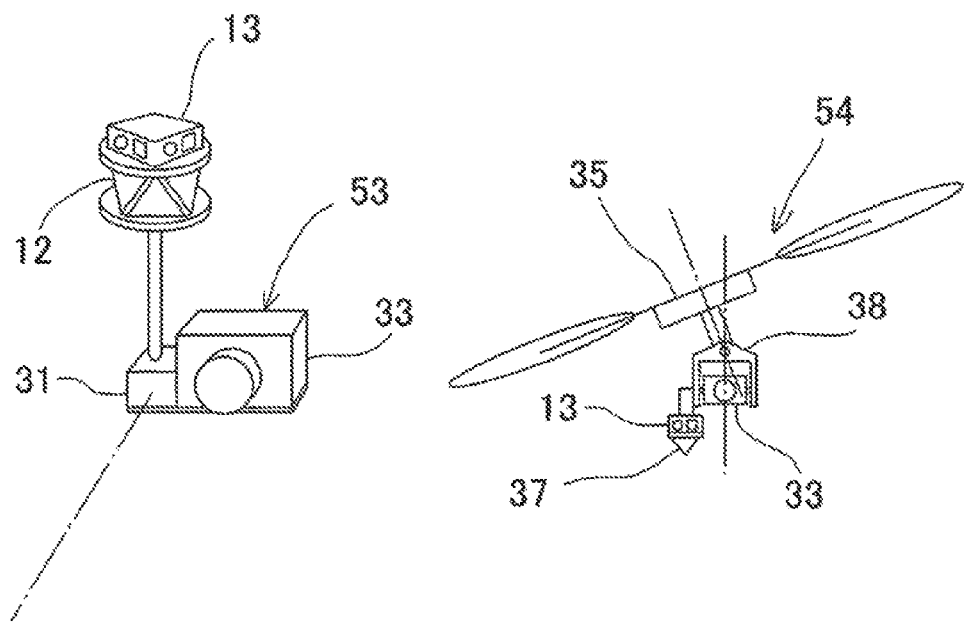

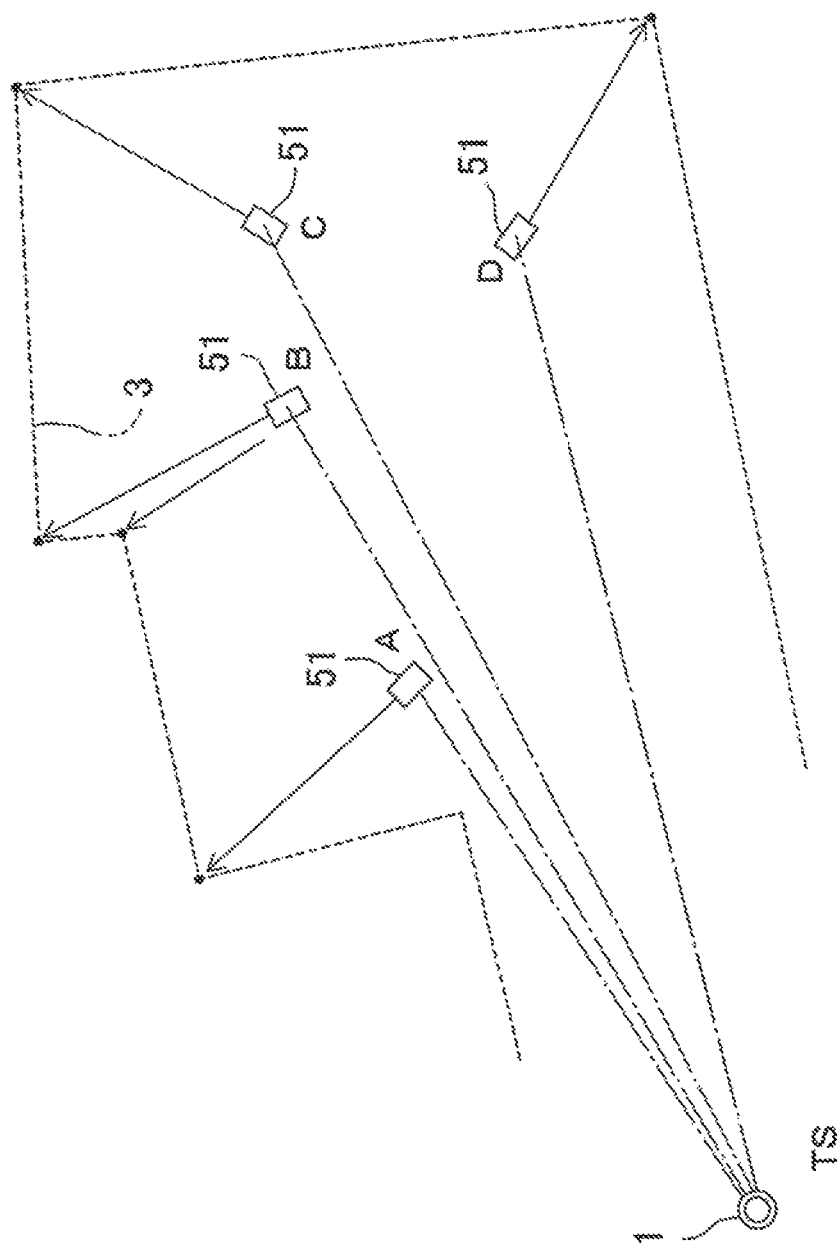

THREE-DIMENSIONAL MEASURING METHOD AND SURVEYING SYSTEM

BACKGROUND OF THE INVENTION

The present invention relates to a three-dimensional measuring method and a surveying system, which has a simple configuration and which can perform three-dimensional measurement over a wide range.

Conventionally, for three-dimensional (hereinafter referred as "3D") measurement of a construction object, a total station or a 3D scanner is used. However, a measuring instrument as such is designed to measure a distance by projecting a distance measuring light and by receiving a reflected distance measuring light. In this respect, it is necessary that an entire measurement area can be overlooked from a point of installation of the measuring instrument. For this reason, there are many restrictions in the place of installation, and further, in a case where a dead area is present for the measurement of an object to be measured, the changing of the installation of the measuring instrument is necessary.

Further, in a case where the object to be measured is a construction object with complicated structure, there may be many portions which cannot be measured due to a problem of a poor field of vision.

In this case, the object to be measured must be measured by installing the measuring instrument at different places, and a 3D model of the object to be measured must be prepared by synthesizing measurement results (i.e. 3D coordinates) obtained by measuring at each of the positions of installation (i.e. measurement position). On the other hand, reference coordinates of the measurement results obtained by measuring at each of the places are the positions of each of the measuring instruments. In a case where the 3D model is prepared, the measurement results obtained at each of the places must be converted to unified coordinates by coordinate conversion.

Further, when converting to unified coordinates by coordinate conversion, a coordinate conversion must be performed to the unified coordinates, a measurement is performed with respect to a distance and an angle between each of the measurement positions each time the measurement position is changed and a coordinate conversion must be performed to the unified coordinates. For this reason, there are problems in that the more complicated the construction object is, the more complicated the working process becomes.

Further, there is a method of synthesizing by using three or more known points, which are called reference points, other than the method of measuring a distance or an angle between the measurement positions. However, there have been problems in that the coordinates cannot be determined or that there are many cases which are complicated.

SUMMARY OF THE INVENTION

It is an object of the present invention to provide a three-dimensional measuring method and a surveying system, by which it is possible to easily perform three-dimensional measurement with a simple configuration regardless of whether an object to be measured is a complicated construction object or whether a measurement environment is a complicated topography.

To attain the object as described above, a three-dimensional measuring method according to the present invention comprises a total station having tracking function and a movable measuring device having a prism for retro-reflecting a distance measuring light and a tracking light projected from the total station and designed as movable and capable of performing three-dimensional measurement on an object to be measured, wherein the total station is installed at a known point, the movable measuring device performs three-dimensional measurement on the object to be measured with reference to a direction of the total station and from an arbitrary position capable of sighting from the total station, the total station measures a measurement position where the movable measuring device performs three-dimensional measurement, and three-dimensional measurement is performed with reference to the total station based on the measurement position of the movable measuring device measured by the total station.

Further, a surveying system according to the present invention comprises a total station installed at a known point and having a tracking function, at least one movable measuring device having a prism for retro-reflecting a distance measuring light and a tracking light projected from the total station and capable of moving and of Performing three-dimensional measurement on an object to be measured and an arithmetic control part, wherein the movable measuring device has an auxiliary measuring unit capable of measuring a distance and an angle of the object to be measured and an attitude detector capable of detecting a measuring direction, a tilting and a tilting direction of the movable measuring device, wherein the movable measuring device performs three-dimensional measurement on the object to be measured with reference to direction of the total station based on the measurement result of the auxiliary measuring unit and on the detection result of the attitude detector at an arbitrary measurement position as being sighted from the total station, wherein the total station performs three-dimensional measurement on the measurement position, and wherein the arithmetic control part performs three-dimensional measurement on the object to be measured with reference to the total station based on the result of three-dimensional measurement obtained by the movable measuring device and on the measurement result by the total station.

Further, in the surveying system according to the present invention, the auxiliary measuring unit of the movable measuring device is an image pickup unit, and three-dimensional measurement of an object no be measured is performed based on images picked up from two arbitrary measurement positions and on a detection result by the attitude detector.

Further, in the surveying system according to the present invention, the auxiliary measuring unit of the movable measuring device is a laser distance measuring unit.

Further, in the surveying system according to the present invention, the auxiliary measuring unit of the movable measuring device is a laser scanner.

Furthermore, in the surveying system according to the present invention, the movable measuring device comprises a small flying vehicle, an image pickup unit installed on the small flying vehicle and a prism for tracking purpose.

According to the present invention, the three-dimensional measuring method comprises a total station having tracking function and a movable measuring device having a prism for retro-reflecting a distance measuring light and a tracking light projected from she total station and designed as movable and capable of performing three-dimensional measurement on an object to be measured, wherein the total station is installed at a known point, the movable measuring device performs three-dimensional measurement on the object to be measured with reference to a direction of the total station and from an arbitrary position capable of sighting from the total station, the total station measures a measurement position where the movable measuring device performs three-dimensional measurement, and three-dimensional measurement is performed with reference to the total station based on the measurement position of the movable measuring device measured by the total station. As a result, without changing the installation of the total station, it is possible to perform measurement over a range where measurement cannot be performed because of a dead area of the total station or the like, and it would suffice if the measurement position of she movable measuring device can be sighted from the total station, and the measurement of the object to be measured can be easily carried out at an arbitrary position.

Furthermore, according to the present invention, the surveying system comprises a total station installed at a known point and having a tracking function, at least one movable measuring device having a prism for retro-reflecting a distance measuring light and a tracking light projected from the total station and capable of moving and of performing three-dimensional measurement on an object to be measured and an arithmetic control part, wherein the movable measuring device has an auxiliary measuring unit capable of measuring a distance and an angle of the object to be measured and an attitude detector capable of detecting a measuring direction, a tilting and a tilting direction of the movable measuring device, wherein the movable measuring device performs three-dimensional measurement on the object to be measured with reference to direction of the total station based on the measurement result of the auxiliary measuring unit and on the detection result of the attitude detector at an arbitrary measurement position as being sighted from the total station, wherein the total station performs three-dimensional measurement on the measurement position, and wherein the arithmetic control part performs three-dimensional measurement on the object to be measured with reference to the total station based on the result of three-dimensional measurement obtained by the movable measuring device and on the measurement result by the total station. As a result, without changing the installation of the total station, it is possible to perform measurement over a range where measurement cannot be performed because of a dead area of the total station or the like, and it would suffice if the measurement position of the movable measuring device can be sighted from the total station, and the measurement of the object to be measured can be easily carried out at an arbitrary position.

BRIEF DESCRIPTION OF THE DRAWINGS

FIG. 2 is a schematical block diagram of a total station and a movable measuring device in the embodiment.

FIG. 3 is a drawing to explain a measuring operation in the embodiment.

FIG. 4 is a drawing to explain a case where measurement is performed on a plurality of targets to be measured, which are included, in an object to be measured in the embodiment.

FIG. 5A, FIG. 5B, FIG. 5C and FIG. 5D are explanatory drawings of a plurality of different types of movable measuring devices, which can be used in the present embodiment respectively. FIG. 5A shows a case where a laser distance measuring unit is provided, FIG. 5B shows a case where a laser scanner is provided, FIG. 5C shows a case where a laser distance measuring unit and an image pickup unit are provided and FIG. 5D snows a case where an image pickup unit is installed on a small flying vehicle.

FIG. 6 is an explanatory drawing to show a measuring operation of a case where a laser distance measuring unit is used as an auxiliary measuring unit.

DETAILED DESCRIPTION OF THE PREFERRED EMBODIMENT

Figure 1:
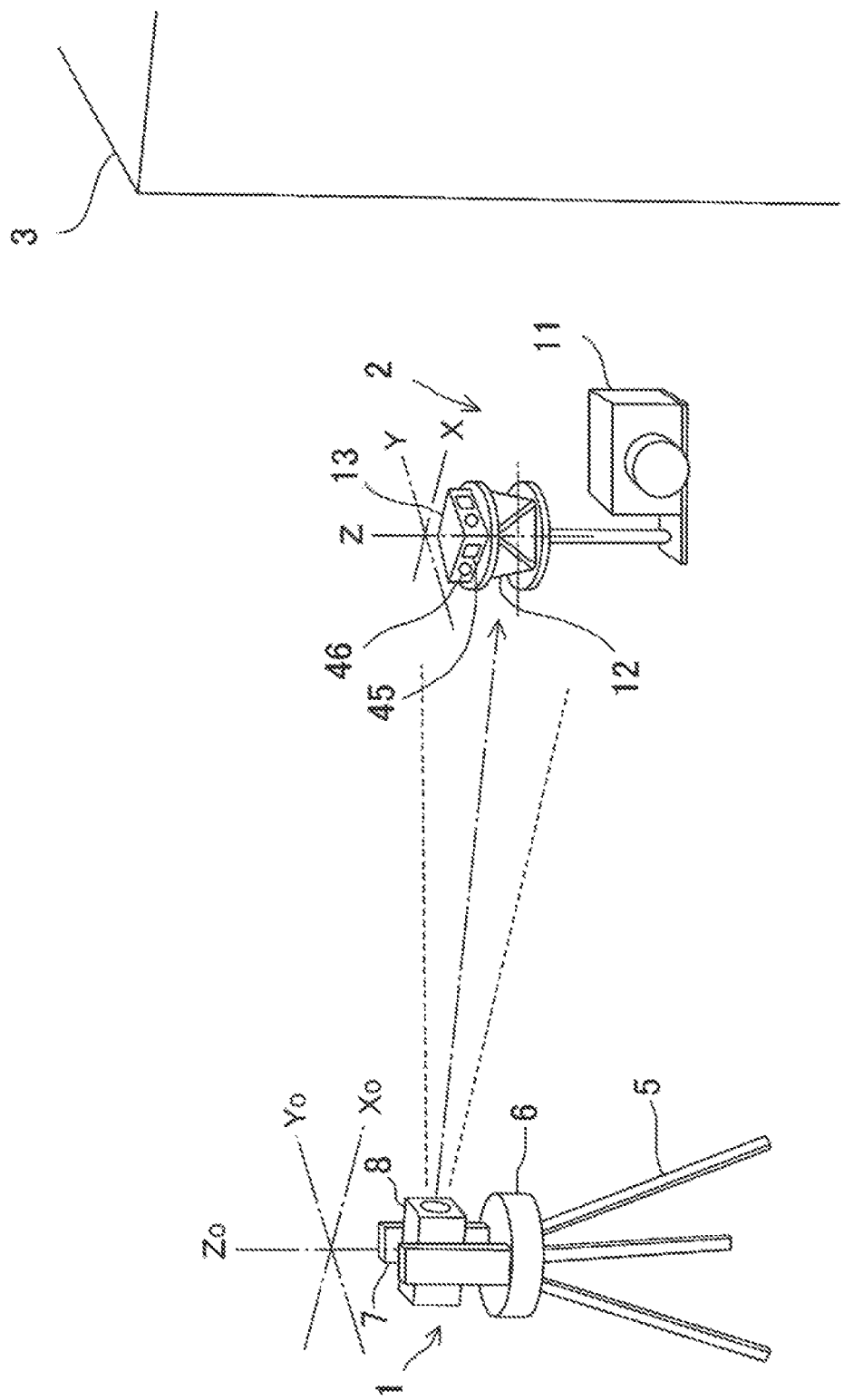
FIG. 1 is a schematical drawing of an embodiment according to the present invention.

Description will be given below on an embodiment of the present invention by referring so the attached drawings.

First, by referring to FIG. 1, description will be given below on general features of an embodiment according to the present invention.

In the figure, reference numeral 1 denotes a total station used as a main surveying device. Reference numeral 2 denotes a movable measuring device used as an auxiliary surveying device and reference numeral 3 denotes an object to be measured. It is to be noted that the total station 1 is a surveying instrument which can measure a distance, a horizontal angle and a vertical angle of a measuring point. Further, in the present invention, the surveying instrument has a tracking function.

The total station 1 is installed at a known position. It is to be noted that the installation position of the total station 1 may be already known as absolute coordinates or may be already known as relative coordinates with respect to the object to be measured 3. Preferably, the total station 1 can perform prism measurement and non-prism measurement and has a tracking function.

As an approximate arrangement of the total station 1, a tripod 5 is installed at a predetermined position. A base unit 6 is installed on the tripod 5, and a frame unit 7 is provided on the base unit 6. Further, a telescope unit 8 is installed on the frame unit 7.

The base unit 6 has a leveling unit and supports the frame unit 7 as rotatable in a horizontal direction with respect to the object to be measured 3. The frame unit 7 supports the telescope unit 8 as rotatable in a vertical direction.

A distance measuring unit to be described later) and an optical system (not shown) are incorporated in the telescope unit 8. The distance measuring unit projects a distance measuring light toward the object to be measured through the optical system, and by detecting a reflected distance measuring light from the object to be measured, a distance is determined in the case of the present embodiment, the object to be measured for the total station 1 is the movable measuring device 2.

Further, a tracking unit (to be described later) is incorporated in the telescope unit 8. The tracking unit projects a tracking light toward the movable measuring device 2 through the optical system, receives a reflected tracking light from the movable measuring device 2 and tracks the movable measuring device 2 when the movable measuring device 2 moves.

The movable measuring device 2 comprises an auxiliary measuring unit 11 for measuring the object to be measured, an omnidirectional prism 12 for retro-reflecting the measuring light and the tracking light from the total station 1, and an attitude detector 13, which has a direction detector, a tilt detector and the like. The movable measuring device 2 can be held and carried by a measurement operator.

It is to be noted that the movable measuring device 2 may be designed as a handy type (or a hand held type), or may be installed by means of a simplified type of tripod or the like.

Further, in FIG. 1, coordinates (X0, Y0, Z0) show a reference coordinate system using the total station 1 as reference, and coordinates (X, Y, Z) show an auxiliary coordinate system using the movable measuring device 2 as reference.

By referring to FIG. 2, further description will be given below on approximate arrangement of the total station 1 and the movable measuring device 2.

The total station 1 primarily comprises a distance measuring unit 15, a tracking unit 16, a horizontal angle detecting unit 17, a vertical angle detecting unit 18, a main arithmetic control part 19, a main storage part 21, a main communication unit 22, a main display unit 23 and a main operation unit 21.

The distance measuring unit 15 projects a distance measuring light 14a and carries out distance measurement by receiving a reflected light from the object to be measured. The tracking unit 16 projects a tracking light 14b, receives the reflected light from the object to be measured, and performs tracking on the object to be measured based on the photodetection result.

The horizontal angle detecting unit 17 detects a horizontal rotation angle of the base unit 6. The vertical angle detecting unit 18 detects an elevation angle of the telescope unit 8, and it is so arranged that a sighting direction, i.e. a horizontal angle and a vertical angle, of the telescope unit 8 is detected based on the detection results of the horizontal angle detecting unit 17 and the vertical angle detecting unit 13.

In the main storage part 21, various types of programs necessary for measurement and a communication. Program necessary for performing data communication to and from the movable measuring device 2 are stored, and the data such as the measurement results measured by the total station 1 and the measurement results measured by the movable measuring device 2 are stored.

According to the program stored in the main storage part 21, the main arithmetic control part 19 performs the measurement and executes operation such as calculation based on the data acquired.

The main communication unit 22 gives and takes various types of data such as an image data, a measurement data, a synchronization data, etc. to and from the movable measuring device 2.

The main display unit 23 displays various types of display such as display of a measurement status and a measurement condition and display of a measurement result. From the main operation unit 24, an input of measurement conditions and an input of measurement instructions and the like are inputted.

The movable measuring device 2 primarily comprises the omnidirectional prism 12, the auxiliary measuring unit 11, the attitude detector 13, and also has an auxiliary arithmetic control part 26, an auxiliary storage part 27, an auxiliary communication unit 28 and an auxiliary operation unit 29.

The auxiliary measuring unit 11 performs a measurement (distance measurement and angle measurement) on the object to be measured. An object to be measured of the auxiliary measuring unit 11 is the object to be measured 3. It is to be noted that when angle measurement is performed, a direction of the total station 1 with respect to the auxiliary measuring unit 11 is regarded as reference.

The attitude detector 13 detects a tilting of the movable measuring device 2, a tilting direction with respect to the total station 1, a measuring direction (photographing direction) of the auxiliary measuring unit 11, or a directional angle with respect to the total station 1. For example, a tilt sensor, an acceleration sensor, a magnetic compass, etc. are detected. In a case where the attitude detector 13 has a magnetic compass, a direction of the attitude detector 13 may be detected as an azimuth and from the azimuth thus detected, the directional angle with respect to the total station 1 may be calculated.

In the auxiliary storage part 27, various types of programs necessary for the auxiliary measuring unit 11 to perform the measurement are stored, and communication programs for carrying out communication of data to and from the total station 1 are stored. In the auxiliary storage part 27, the measurement results acquired by the auxiliary measuring unit 11 or the data transmitted from the total station 1 are stored.

The auxiliary arithmetic control part 26 carries out the measurement according to the programs stored in the auxiliary storage part 27. The auxiliary arithmetic control part 26 is so arranged that a synchronization signal is issued and based on the synchronization signal, the auxiliary arithmetic control part 26 executes controlling such as synchronization control of the measurement by the auxiliary measuring unit 11.

Various measuring means are used for the auxiliary measuring unit 11. As the auxiliary measuring unit 11 as shown in FIG. 1, a digital camera (image pickup unit) capable of acquiring digital images is used.

FIG. 3 shows a measuring operation in an embodiment. In the embodiment, a photogrammetry is carried out according to the images acquired by the auxiliary measuring unit 11. It is to be noted that in the measurement by the auxiliary measuring unit 11, measurement is carried out under the condition that the auxiliary measuring unit 11 is held by a measurement operator. Further, a measurement position of the auxiliary measuring unit 11 is a position where the movable measuring device 2 (the omnidirectional prism 12) can be sighted from the total station 1.

The auxiliary measuring unit 11 is installed at a measuring point A (i.e. a measurement operator holds the auxiliary measuring unit 11 at the measurement point A), an image of a target to be measured 9 is picked up from the measurement point A, and an image of the target to be measured 9 is acquired. An attitude of the movable measuring device 2 (i.e. tilting, tilting direction, measuring direction or directional angle and image pickup direction with respect to the total station 1) is detected by the attitude detector 13 at the moment of image acquisition, and the attitude thus detected is associated with the acquired image and is stored in the auxiliary storage part 27 together with the images. Here, the target to be measured 9 is in dead area from the total station 1 and cannot be measured directly.

Next, by moving toward a measuring point B, an image of the target to be measured 9 is picked up, and the image of the target to be measured 9 is acquired. Similarly, an attitude of the movable measuring device 2 (tilting, tilting direction, measuring direction or directional angle and image pickup direction with respect to the total station 1) is detected by the attitude detector 13 at the moment of image acquisition, and the attitude thus detected is associated with the acquired image and is stored in the auxiliary storage part 27 together with the images.

The image data acquired at the measuring point A and the measuring point B and the attitude data associated with the image data are transmitted to the main communication unit 22 by the auxiliary communication unit 28 and are stored in the main storage part 21 via the main communication unit 22.

The total station 1 tracks the omnidirectional prism 12 and performs sighting, performs distance measurement and angle measurement of the auxiliary measuring unit 11 and acquires three-dimensional coordinates having reference on the total station 1 of the auxiliary measuring unit 11 at the measuring point A, i.e. three-dimensional coordinates in the reference coordinate system. Similarly, three-dimensional coordinates of the auxiliary measuring unit 11 at she measuring point B are acquired.

Synchronization signal is issued from the auxiliary measuring unit 11 to the total station 1 via the main communication unit 22 and the auxiliary communication unit 28, and the measurement timing of the movable measuring device 2 is controlled based on the synchronization signal so that the measurement by the movable measuring device 2 is performed at the measuring point A and the measuring point B at the same time as when the total station 1 performs measurements of the measuring point A and the measuring point B.

Further, the main arithmetic control part 19 calculates a distance D (base line length D) between the measuring point A and the measuring point B based on the three-dimensional coordinates of each of the measuring point A and the measuring point B respectively and carries out a relative orientation of the images acquired at the measuring point A and the measuring point B based on the base line length D and the attitude data. As a result, a three-dimensional data of the target to be measured 9 in the auxiliary coordinate system having the movable measuring device 2 as reference can be acquired.

Further, the main arithmetic control part 19 can convert three-dimensional data of the target to be measured 9 to the data of reference coordinate system having reference on the total station 1 based on the coordinates of the measuring point A and the measuring point B as determined by the total station 1. Further, a 3D model in the reference coordinate system is prepared. It is to be noted that the conversion to the data of the reference coordinate system and the preparation of the 3D model may be carried out at the auxiliary arithmetic control part 26 of the movable measuring device 2 or may be carried out at an arithmetic control part separately prepared.

FIG. 4 shows a case where measurement is performed on a plurality of targets to be measured, which are included in the object to be measured.

For instance, in a case where the measurement is performed on a target to be measured 3, the images of the target to be measured S are picked up from a point A and a point B by the movable measuring device 2, and a 3D model is prepared with reference to the movable measuring device 2 with respect to the target to be measured S based on the images acquired at the point A and the point B. Further, the total station 1 measures three-dimensional coordinates of the movable measuring device 2 at the point A and at the point B.

Next, in a case where measurement is performed on a target to be measured T, the movable measuring device 2 is moved to a point C. After the image of the target to be measured T has been picked up, the movable measuring device 2 is further moved to a point D, and the image of the target to be measured T is picked up.

The total station 1 tracks the movable measuring device 2 (i.e. the omnidirectional prism 12) when the movable measuring device 2 is moved, and three-dimensional coordinates of the movable measuring device 2 at the point C and at the point D are measured. From the images acquired at the point C and at the point D, a 3D model is prepared with respect to the target to be measured T with reference to the movable measuring device 2. Similarly, a 3D model is prepared with respect to the target to be measured U from images acquired at a point E and at a point F with reference to the movable measuring device 2.

Coordinates of the point A, the point B, the point C, the point D, the point E and the point F are already measured by the total station 1. Therefore, 3D models for each of the targets to be measured S, T and U can be synthesized based on the results measured by the total station 1, and a 3D model for the object to be measured 3 can be prepared.

As described above, by synthesizing three-dimensional data acquired by the movable measuring device 2 according to the measurement results of the total station 1, which is installed at a fixed position, a measurement of the object to be measured with a complicated shape and a measurement of the object to be measured at a complicated topography can be carried out without changing the installation position of the total station 1.

By installing the total station 1 at one point, a 3D model of the entire object to be measured can be prepared in a simple manner. Further, since measurement is performed by using the movable measuring device 2, which is designed as portable, a three-dimensional surveying system with high mobility can be provided.

Also, it may be so arranged that the results of measurement by the total station 1 are transmitted to the movable measuring device 2 side and three-dimensional data acquired by the auxiliary measuring unit 11 may be converted to three-dimensional data of the reference coordinate system by the auxiliary measuring unit 11, and a 3D model of the entire object to be measured may be prepared Further, it may be arranged in such manner that the movable measuring device 2 is designed to fulfill the function as a data collecting device and the collected data are inputted to a PC or the like, which is separately provided, and that three-dimensional data of the target to be measured 9 in an auxiliary coordinate system with reference to the movable measuring device 2 may be acquired by the PC, and further, a 3D model of the entire object to be measured may be prepared by the PC. Further, it may be so arranged that measurement can be performed in wider range by using a plurality of movable measuring devices 2.

Next, various types of devices can be used as the movable measuring device 2.

FIG. 5A to FIG. 5D shows a plurality of various types of the movable measuring devices, which can be used.

First, FIG. 5A shows a movable measuring device 51, in which a laser distance measuring unit 31 is used instead of an image pickup unit as the auxiliary measuring unit 11 as shown in FIG. 1.

In the movable measuring device 51, the laser distance measuring unit 31, an omnidirectional prism 12 and an attitude detector 13 are integrally mounted on a knob member 30 in order to provide better portability and operability.

By using the laser distance measuring unit 31, the distance to the measuring point can be immediately acquired. Further, by taking into account the detection result of the attitude detector 13, three-dimensional coordinates of the measuring point can be acquired with reference to the laser distance measuring unit 31. It is to be noted that the omnidirectional prism 12 reflects a distance measuring light 14a from the total station 1 toward the total station 1, and the total station 1 measures the position of the movable measuring device 51. Therefore, three-dimensional coordinates of the measuring point measured by the laser distance measuring unit 31 can be converted by coordinate conversion to a reference coordinate system of the total station 1.

FIG. 5B shows a movable measuring device 52, which uses a laser scanner 32 as an auxiliary measuring unit 11. By using the laser scanner 32, a measurement can be performed on a multiple number of points at the same time and three-dimensional point group data of the object to be measured can be acquired. The three-dimensional point group data can also be converted by coordinate conversion to three-dimensional point group data of the reference coordinate system based on the measurement result by the total station 1.

FIG. 5C shows a movable measuring device 53, which uses a laser distance measuring unit 31 and an image pickup unit 33 as an auxiliary measuring unit 11. In the movable measuring device 53, a distance measurement of the object to be measured is executed by the laser distance measuring unit 31, and an image of the measuring point and the images of the surrounding can be acquired, and three-dimensional data with images can be acquired.

The movable measuring device 54 as shown in FIG. 5D has such arrangement that the image pickup unit 33 is installed on a remotely-controlled small flying vehicle (UAV) 35. On the small flying vehicle 35, a prism 37 for tracking purpose is further provided, and the prism is installed integrally with the image pickup unit 33 and a positional relation with the image pickup unit 33 is already known. The image pickup unit 33 and the prism 37 are installed on the small flying vehicle 35 via a gimbal 38, and it is so arranged that the image pickup unit 33 and the prism 37 are constantly maintained in a certain fixed attitude.

Further, an attitude detector 13 (e.g. a gyro, a magnetic compass, a tilt sensor, etc.) is installed on the movable measuring device 54 so that a flying attitude of the small flying vehicle 35 can be detected and also an optical axis direction of the image pickup unit can be detected. The movable measuring device 54 picks up images of the objects to be measured at a plurality of points and the images are acquired for photogrammetry.

A tracking light 14h is projected from the total station 1, and the tracking light 14b reflected by the prism 37 is received by the tracking unit 16 (see. FIG. 2), and the movable measuring device 54 is tracked by the total station 1.

Further, a position (three-dimensional coordinates) of the movable measuring device 54 is tracked and measured by the total station 1. A synchronization signal is issued from the total station 1 to the movable measuring device 54, and based on the synchronization signal, the image pick up by the movable measuring device 54 and the measurement by the total station 1 are synchronously controlled and a position of the movable measuring device 54 at the moment when the image is acquired by the movable measuring device 54 is measured by the total station 1.

Based on the position of acquisition of the image by the movable measuring device 54 and based on the image acquired, three-dimensional data of the objects to be measured are acquired, three-dimensional data are converted by coordinate conversion to a reference coordinate system of the total station 1 and a 3D model of the entire object to be measured is prepared.

FIG. 6 shows a measuring operation when the laser distance measuring unit 31 is used as the auxiliary measuring unit 11.

A measurement operator holds the movable measuring device 51 and moves to a point A, a point B, a point C, and a point D within the range as the movable measuring device 51 can be sighted by the total station 1, and performs distance measurement at each of the points. Three-dimensional coordinates of the point A, the point B, the point C and the point D are measured by the total station 1. Therefore, the measurement results measured by the movable measuring device 51 can be converted by coordinate conversion to the reference coordinated system of the total station 1. It is to be noted that the measuring operation can be carried out in a similar manner in a case where the movable measuring device 52 with the laser scanner 32 is used as the auxiliary measuring unit 11.

Figure 7:
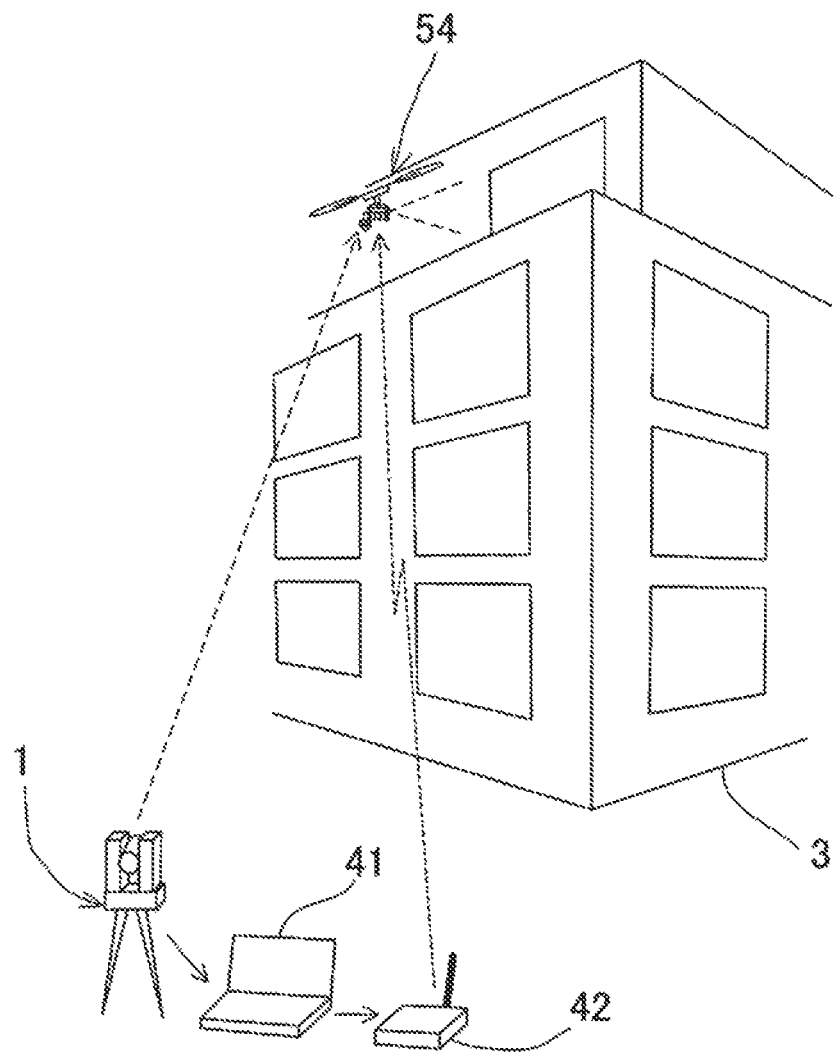
FIG. 7 is an explanatory drawing to show a measuring operation of a surveying system using a small flying vehicle as a movable measuring device.

FIG. 7 shows the measuring operation of the surveying system using the movable measuring device 54.

In FIG. 7, reference numeral 41 denotes a PC as a base station control device and reference numeral 42 denotes a remote control device which controls a flight of the movable measuring device 54 and photographing.

The total station 1 tracks the movable measuring device 54, measures a position of the movable measuring device 54, and a positional, information as measured is transmitted to the base station control device 41. Further, the movable measuring device 54 acquires an image by the image pickup unit 33 (see FIG. 5D), and the image is transmitted to the base station control device 41.

The base station control, device 11 sets up a flight course of the movable measuring device 54 and controls the flight of the movable measuring device 54 according to the flight course. Further, the base station control device 41 carries out synchronization control of position measurement of the movable measuring device 54 by the total station 1 and image pickup by the movable measuring device 54, and the images associate the positions where the images are acquired.

Also, based on the images, the base station control device 41 prepares a 3D model with reference to the movable measuring device 54, and further, a 3D model of the reference coordinate system is prepared based on the measurement results by the total station 1.

By using the movable measuring device 54, a 3D model as measured from the above can be prepared.

Figure 8:
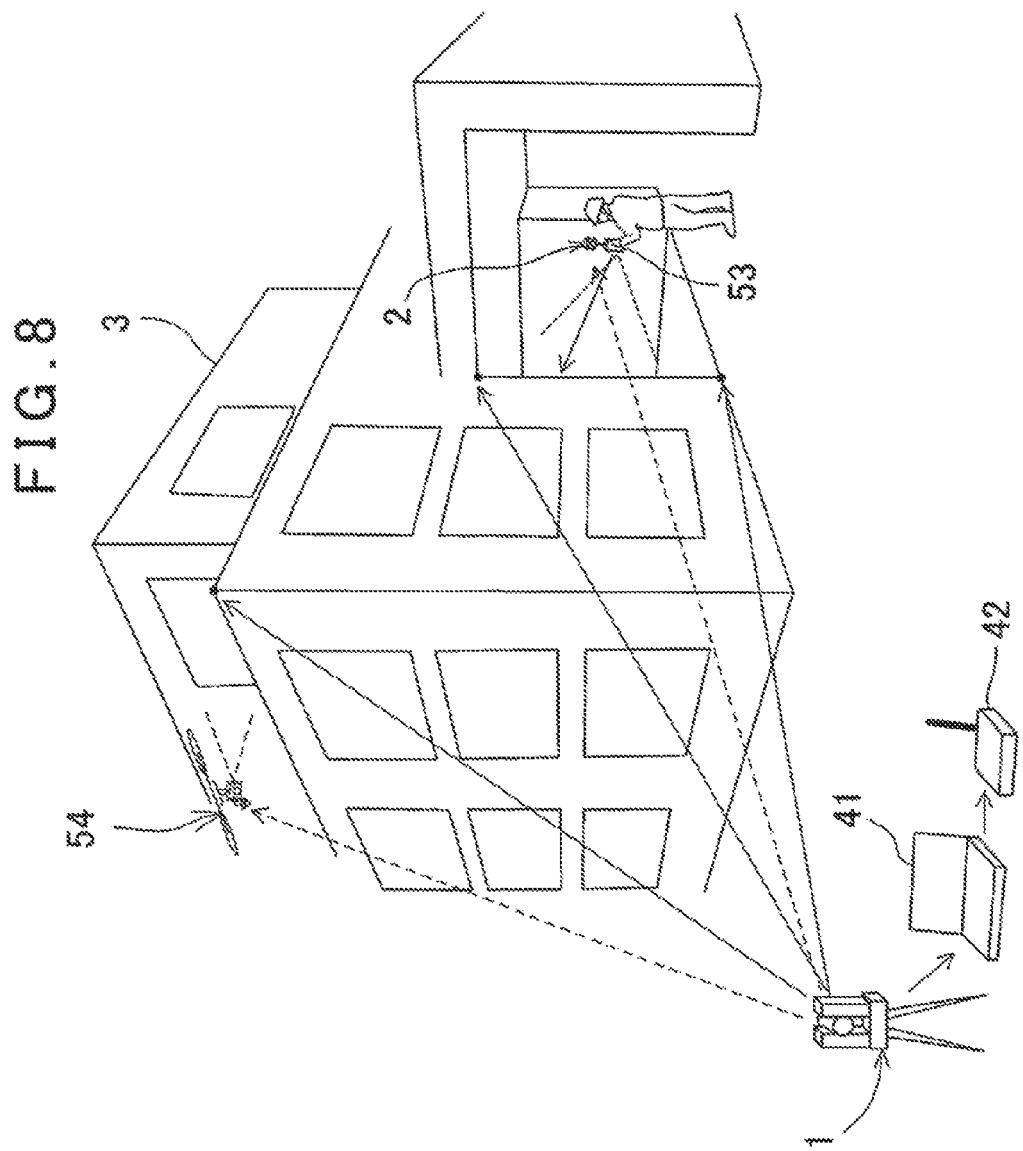
FIG. 8 is an explanatory drawing to show a measuring operation of the surveying system using a plurality of different types of movable measuring devices.

FIG. 8 shows a measuring operation of the surveying system which uses the movable measuring device 54 and another arbitrary type of movable measuring device. Further, an example is shown where the movable measuring device 53 is used as another movable measuring device.

Because the total station 1 tracks the movable measuring device 54 or the movable measuring device 53, it is preferable that a measurement by the movable measuring device 54 and a measurement by the movable measuring device 53 are separated from each other. It is to be noted that the synchronization of the measurement by the movable measuring device 54 and the measurement by the total station 1 is carried out by the base station control device 41. Similarly, the synchronization of the measurement by the movable measuring device 53 and the measurement by the total station 1 is carried out by the base station control device 41.

For instance, the measurement from the above direction is carried out by the movable measuring device 54, and after the measurement data have been acquired, the measurement by the movable measuring device 53 is carried out. The measurement results are transmitted to the base station control device 41 respectively.

In the base station control device 41, a 3D model with reference to the movable measuring device 54 is prepared based on the measurement results obtained by the movable measuring device 54. Based on the measurement results obtained by the movable measuring device 53, a 3D model with reference to the movable measuring device 53 is prepared.

Based on the measurement results of the total station 1, the two 3D models are converted by coordinate conversion to a reference coordinate system, and further synthesized as a 3D model of the reference coordinate system.

In order to detect a measuring attitude of the movable measuring device 53, a relative position and the attitude relation between the movable measuring device 53 and the total station 1, the movable measuring device 53 has the attitude detector 13.

As one example of the attitude detector 13, the one adequately selected from an attitude sensor, an acceleration sensor, a tilt sensor and a magnetic compass or a combination of these or the like may be considered.

Further, as other examples, a tilt sensor using a polarized light or an attitude sensor using images may be used.

Figure 9:
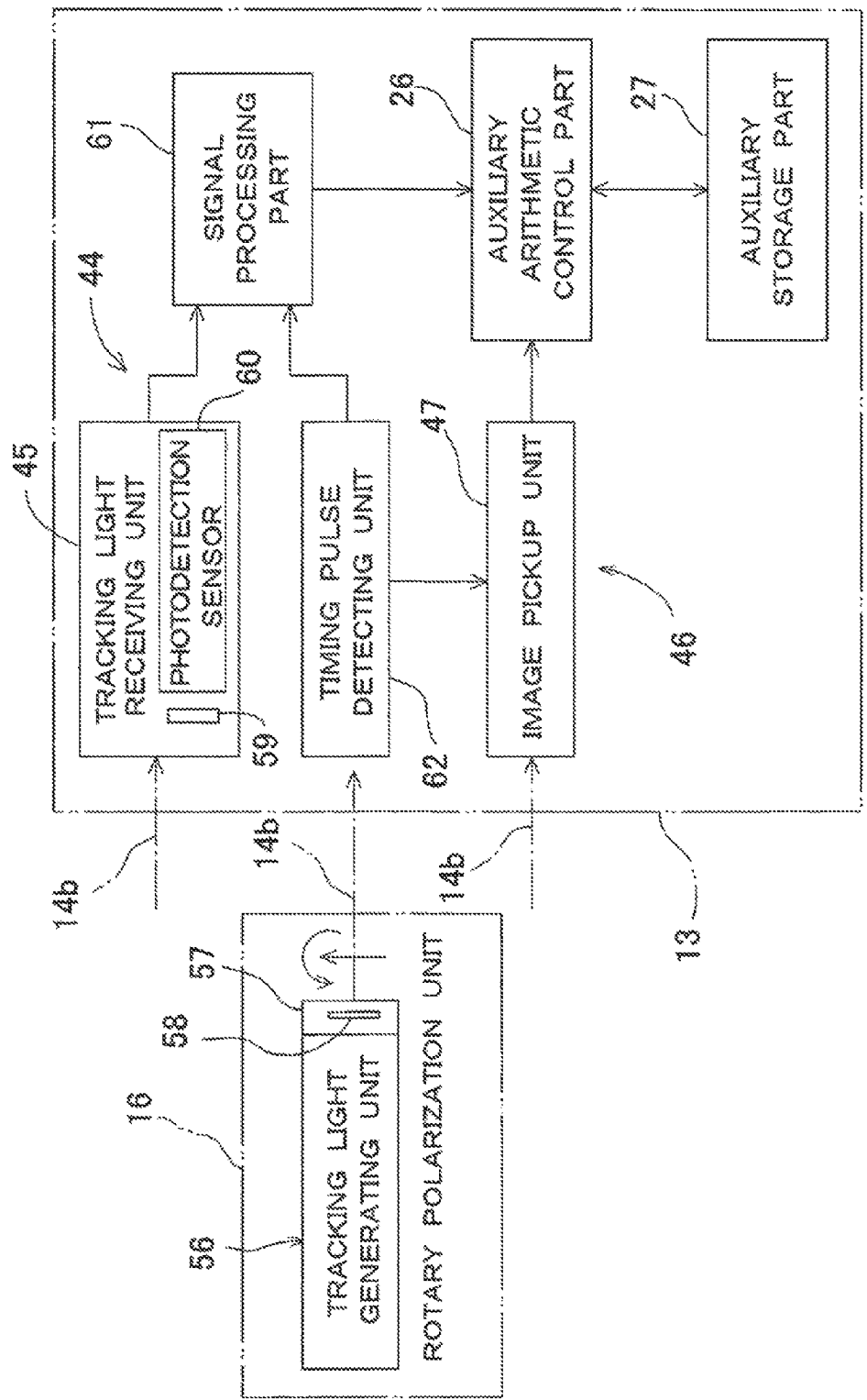
FIG. 9 is a schematical block diagram to show one example of an attitude detector.

Referring to FIG. 9, a description will be given on one example of an attitude detector 13 provided with a tilt sensor 44 using the polarized light and an attitude sensor 46 using images. It is to be noted that in FIG. 9, the same component as shown in FIG. 1 and FIG. 2 is referred by the same symbol.

First, a description will be given on the tilt sensor 44. As to be described later, the tilt sensor 44 has a tracking light receiving unit 45, a timing pulse detecting unit 62, a signal processing part 61 and an auxiliary arithmetic control part 26.

The tracking unit 16 has a tracking light generating unit 56, and the tracking light generating unit. 56 emits a pulsed light as a tracking light 14b. The tracking light generating unit 56 is further provided with a polarized light rotating unit 57. The polarized light rotating unit 57 projects a tracking light 14b, which is emitted by the tracking light emitting unit 56, through a rotary polarizing plate 58 and turned to the tracking light 14b to a polarized, bean and rotates a polarizing plane at a predetermined rotation speed (constant speed rotation).

Therefore, the tracking light 14b projected from the tracking unit 16 is a pulsed light and further the polarizing plane is turned to a polarized beam, which is rotated at constant speed.

The tracking light generating unit 56 sets up a reference position with respect to a rotation angle of the rotary polarizing plate 58. For instance, under the condition where the total station 1 is leveled, a rotation angle of the rotary polarizing plate 58 is set to 0° when the polarizing plane is turned to a vertical direction.

The movable measuring device 2 (see FIG. 1) is provided with the tracking light receiving unit 45 (see FIG. 9) and the attitude sensor 46 (see FIG. 9) in addition to the omnidirectional prism 12. The tracking light 14b is reflected by the omnidirectional prism 12 and is received by the tracking light receiving unit 45 and the attitude sensor 46.

The tracking light receiving unit 45 has a fixed polarizing plate 59 and a photodetection sensor 60 and it is designed so that the photodetection sensor 60 receives the tracking light 14b through the fixed polarizing plate 59. The polarizing plane of the fixed polarizing plate 59 is fixed in such a manner that the movable measuring device 2 is at a horizontal attitude and is set in vertical direction, for instance.

By the fact that the photodetection sensor 60 receives the polarized beam as rotated, a photodetection light amount detected by the photodetection sensor 60 is changed according to a sine curve, which becomes one cycle when the rotary polarizing plate 58 is rotated by 180°.

Under the condition that the rotary polarizing plate 58 and the fixed polarizing plate 59 are in a positional relation as described above, a light, amount reaches the maximum value when the movable measuring device 2 is in horizontal attitude and the light amount is decreased when the movable measuring device 2 is tilted. Therefore, if a phase difference is detected in the sine curve based on a change of the light amount, a tilting angle of the movable measuring device 2 can be detected.

The photodetection signal from the tracking light receiving unit 45 is outputted to the signal processing part 61 and is transmitted to the auxiliary arithmetic control part 26 after signal processing such as amplification, A/D conversion, etc. at the signal processing part 61.

The tracking light 14b is detected at the timing pulse detecting unit 62. The timing pulse detecting unit 62 produces a timing signal based on the pulsed light emitting timing of the tracking light 14b. Further, a reference signal, which indicates the reference rotating position of the rotary polarizing plate 58, is overlapped on the tracking light 14b and the timing pulse detecting unit 62 also detects the reference signal at the same time. As she reference signal, the reference signal widens the width of the light pulse or the like when the rotary polarizing plate 58 is the reference rotating position.

At the signal processing part 61, the timing signal produced at the timing pulse detecting unit 62 and the reference signal detected are associated with a photodetection signal from the attitude sensor 46 and are outputted to the auxiliary arithmetic control part 26 from the signal processing part 61.

In the auxiliary arithmetic control part 26, the sine curve is calculated according to the photodetection signal and the timing signal, and based on the sine curve and the reference signal, a phase difference (rotation angle) between the rotary polarizing plate 58 and the fixed polarizing plate 59 is calculated.

As a result, a tilt of the movable measuring device 2 can be measured with reference to the total station 1. Further, if the total station 1 is leveled, the tilt of the movable measuring device 2 with respect to the vertical direction can be determined.

Next, description will be given on the attitude sensor 46 using images.

The attitude sensor 46 is integrated with the tilt sensor 44 and the attitude sensor 46 is configured so as to receive the tracking light 14b. Further, the tilt sensor 44 comprises an image pickup unit 47, the auxiliary arithmetic control part 26 and the auxiliary storage part 27.

The attitude sensor 46 has the image pickup unit 47 to acquire digital images. The image pickup unit 47 has a photodetection element (not shown). When the image pickup unit 47 directly faces the total station 1 and when an optical axis of its own coincides with an optical axis (i.e. optical axis of the tracking light) of the total station 1, it is so arranged that a photodetection position on the photodetection element will be at the reference position (e.g. center of the photodetection element).

Therefore, when a deviation occurs between the optical axis of its own and the optical axis of the tracking light, the photodetecting position on the photodetection element is also deviated from the reference position. Because the amount of deviation and the direction of deviation correspond with the amount of tilting and to the direction of tilting of the movable measuring device 2, the tilting amount and tilting direction of the movable measuring device 2 can be detected based on the amount of deviation and the direction of deviation.

Further, the total station 1 and the movable measuring device 2 can be synchronously controlled according to the timing signal, and the results measured by the movable measuring device 2 are associated with the attitude detected by the attitude detecting unit 13.

It would suffice if either one of the distance measuring light or the tracking light projected by the total, station 1 is set as the pulsed laser, or the distance measuring light is emitted by pulsed emitting and the timing signal may be produced from the distance measuring light. The timing signal may be produced based on a driving signal on the side were the pulsed light emission is driven, or may be produced based on a photodetection signal, on the light receiving side.

Further, a timing signal generator may be provided separately and an attitude detection and a synchronization control may be carried out according to the timing signal generated by the timing signal generator.

The invention claimed is:

1. A three-dimensional measuring method comprising a total station having tracking function and a movable measuring device having a prism for retro-reflecting a distance measuring light and a tracking light, which is a polarized light emitted in pulses via a rotary polarizing plate, projected from said total station, an attitude detector which detects a tilting of said movable measuring device, a tilting direction with respect to said total station and a directional angle with respect to said total station, and designed as movable and capable of performing three-dimensional measurement on an object to be measured, wherein said attitude detector comprises a tilt sensor having a fixed polarizing plate in which said movable measuring device is set in a vertical direction at a horizontal attitude and a photodetection sensor, and an attitude sensor having an image pickup unit, a relationship of the fixed polarizing plate and said rotary polarizing plate is set in such a manner that the light amount of a tracking light which is received by the photodetection sensor via the fixed polarizing plate is to reach a maximum value when the movable measuring device is in a horizontal attitude, a measuring direction, a tilting and a tilting direction of said movable measuring device is detected based on a phase difference with respect to a tilt of said movable measuring device of a sine curve of a change of the light amount acquired by the rotation of said rotary polarizing plate and an amount of deviation and a direction of deviation from a reference position of said tracking light with respect to said image pickup unit, wherein said total station is installed at a known point, said movable measuring device performs three-dimensional measurement on the object to be measured with reference to a direction of said total station and from an arbitrary position capable of sighting from said total station, said total station measures a measurement position where said movable measuring device performs three-dimensional measurement, and three-dimensional measurement result of said movable measuring device is converted to data of a reference coordinate system of said total station based on detection result of said attitude detector and the measurement position of said movable measuring device measured by said total station.

2. A surveying system, comprising a total station installed at a known point and having a tracking function, at least one movable measuring device having a prism for retro-reflecting a distance measuring light and a tracking light, which is a polarized light emitted in pulses via a rotary polarizing plate, projected from said total station and capable of moving and of performing three-dimensional measurement on an object to be measured and an arithmetic control part, wherein said movable measuring device has an auxiliary measuring unit capable of measuring a distance and an angle of the object to be measured and an attitude detector capable of detecting a measuring direction, a tilting and a tilting direction of said movable measuring device, wherein said attitude detector comprises a tilt sensor having a fixed polarizing plate in which said movable measuring device is set in a vertical direction at a horizontal attitude, and a photodetection sensor, and an attitude sensor having an image pickup unit, a relationship of the fixed polarizing plate and said rotary polarizing plate is set in such a manner that the light amount of a tracking light which is received by the photodetection sensor via the fixed polarization plate is to reach a maximum value when the movable measuring device is in a horizontal attitude, a measuring direction, a tilting and a tilting direction of said movable measuring device is detected based on a phase difference with respect to a tilt of said movable measuring device of a sine curve of a change of the light amount acquired by the rotation of said rotary polarizing plate and an amount of deviation and a direction of deviation from a reference position of said tracking light with respect to said image pickup unit, wherein said movable measuring device performs three-dimensional measurement on the object to be measured with reference to direction of said total station based on the measurement result of said auxiliary measuring unit and on the detection result of said attitude detector at an arbitrary measurement position as being sighted from the total station, wherein said total station performs three-dimensional measurement on said measurement position, and wherein said arithmetic control part performs three-dimensional measurement on said object to be measured with reference to said total station based on the result of three-dimensional measurement obtained by said movable measuring device and on the measurement result by said total station.

3. A surveying system according to claim 2, wherein said auxiliary measuring unit of said movable measuring device is an image pickup unit, and three-dimensional measurement of an object to be measured is performed based on images picked up from two arbitrary measurement positions and on a detection result by said attitude detector.

4. A surveying system according to claim 2, wherein said auxiliary measuring unit of said movable measuring device is a laser distance measuring unit.

5. A surveying system according to claim 2, wherein said auxiliary measuring unit of said movable measuring device is a laser scanner.

6. A surveying system according to claim 2, wherein said movable measuring device comprises a small flying vehicle, an image pickup unit installed on said small flying vehicle and a prism for tracking purpose.

7. A surveying system according to claim 2, wherein said auxiliary measuring unit of said movable measuring device is an image pickup unit, and three-dimensional measurement of an object to be measured is performed based on images picked up from two arbitrary measurement positions and on a detection result by said attitude detector, and said movable measuring device comprises a small flying vehicle, an image pickup unit installed on said small flying vehicle and a prism for tracking purpose.

8. A surveying system according to claim 2, wherein said auxiliary measuring unit of said movable measuring device is a laser distance measuring unit, and said movable measuring device comprises a small flying vehicle, an image pickup unit installed on said small flying vehicle and a prism for tracking purpose.

9. A surveying system according to claim 2, wherein said auxiliary measuring unit of said movable measuring device is a laser scanner, and said movable measuring device comprises a small flying vehicle, an image pickup unit installed on said small flying vehicle and a prism for tracking purpose.

* * * * *